United States Patent
Tanaka et al.

(10) Patent No.: US 8,601,810 B2
(45) Date of Patent: Dec. 10, 2013

(54) INTERNAL COMBUSTION ENGINE

(75) Inventors: Hideyuki Tanaka, Chiyoda-ku (JP); Noriyuki Inoue, Chiyoda-ku (JP); Yohei Akashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 656 days.

(21) Appl. No.: 12/612,184

(22) Filed: Nov. 4, 2009

(65) Prior Publication Data

US 2010/0263374 A1 Oct. 21, 2010

(30) Foreign Application Priority Data

Apr. 15, 2009 (JP) ................................ 2009-099229

(51) Int. Cl.
*F02B 23/00* (2006.01)
*F02B 33/44* (2006.01)

(52) U.S. Cl.
USPC .................................. 60/602; 60/607; 60/608

(58) Field of Classification Search
USPC ........................................... 60/602, 608, 607
See application file for complete search history.

(56) References Cited

U.S. PATENT DOCUMENTS

| | | | | |
|---|---|---|---|---|
| 3,257,796 A | * | 6/1966 | Updike | 60/602 |
| 3,941,035 A | * | 3/1976 | Mueller | 92/49 |
| 4,203,296 A | * | 5/1980 | Tanaka et al. | 60/602 |
| 4,248,047 A | * | 2/1981 | Sumi | 60/602 |
| 4,287,717 A | * | 9/1981 | Oldfield et al. | 60/606 |
| 4,373,335 A | * | 2/1983 | Kuribayashi | 60/602 |
| 4,467,606 A | * | 8/1984 | Chaffiotte | 60/602 |
| 4,510,754 A | * | 4/1985 | Rahnke | 60/602 |
| 4,513,571 A | * | 4/1985 | Jenny et al. | 60/603 |
| 4,603,552 A | * | 8/1986 | Kido | 60/605.1 |
| 4,741,163 A | * | 5/1988 | Hidaka et al. | 60/602 |
| 4,756,155 A | * | 7/1988 | Shinzawa | 60/285 |
| 5,297,532 A | * | 3/1994 | Ikebe et al. | 123/564 |
| 6,637,204 B2 | * | 10/2003 | Ellmer et al. | 60/606 |

(Continued)

FOREIGN PATENT DOCUMENTS

| | | |
|---|---|---|
| DE | 100 27 668 A1 | 6/2001 |
| DE | 10 2004 057 397 A1 | 6/2006 |

(Continued)

OTHER PUBLICATIONS

English Translation of JP 2005-171896, Machine Translated on Jul. 20, 2012.*

(Continued)

*Primary Examiner* — Thai Ba Trieu
*Assistant Examiner* — Patrick Maines
(74) *Attorney, Agent, or Firm* — Sughrue Mion, PLLC

(57) ABSTRACT

Provided is an internal combustion engine for improving fuel-economy performance in any of the case where supercharging performed by an electric supercharger is required and the case where the supercharging is not required. The internal combustion engine includes: an electric supercharger; a supercharger; an electric motor; and a controller, the electric supercharger being for compressing an intake air by rotation of the supercharger caused with rotation of the exhaust turbine by an exhaust gas energy to perform supercharging and for rotationally driving the supercharger with electric-motor assistance by the electric motor; an exhaust bypass passage provided to bypass the exhaust turbine; and an opening and closing the exhaust bypass passage unit. In the internal combustion engine, the opening and closing the exhaust bypass passage unit opens the exhaust bypass passage until the supercharging is started by the electric supercharger.

5 Claims, 3 Drawing Sheets

(56) References Cited

U.S. PATENT DOCUMENTS

| | | |
|---|---|---|
| 2005/0022520 A1* | 2/2005 | Shirakawa et al. ............ 60/297 |
| 2006/0107658 A1* | 5/2006 | Hiranuma et al. ............ 60/297 |
| 2006/0156724 A1* | 7/2006 | Dismon et al. ............ 60/605.2 |
| 2008/0053091 A1* | 3/2008 | Barthelet .................... 60/608 |

FOREIGN PATENT DOCUMENTS

| | | | |
|---|---|---|---|
| EP | 1 749 990 A2 | | 2/2007 |
| JP | 02-053252 U | | 5/1990 |
| JP | 05-280364 A | | 10/1993 |
| JP | 10-159576 A | | 6/1998 |
| JP | 2003-307151 A | | 10/2003 |
| JP | 2005-009315 A | | 1/2005 |
| JP | 2005-171896 A | | 6/2005 |
| JP | 2005171896 A | * | 6/2005 |
| JP | 2006144583 A | * | 6/2006 |
| JP | 2006322427 A | | 11/2006 |
| JP | 2008-196323 A | | 8/2008 |
| JP | 2008-196332 A | | 8/2008 |

OTHER PUBLICATIONS

English Translation of JP 2006-144583, Machine Translated on Jul. 20, 2012.*
German Office Action issued in German Patent Application No. 10 2009 053 705.8 dated Aug. 19, 2013.

* cited by examiner

INTERNAL COMBUSTION ENGINE

BACKGROUND OF THE INVENTION

1. Field of the Invention

The present invention relates to an internal combustion engine including a supercharger provided on an intake passage, which is electric-motor-assisted by an electric motor.

2. Description of the Related Art

For improving fuel economy of automobiles, a technology of providing a supercharger, which is driven by an electric motor, on an intake passage to increase an output of an engine (internal combustion engine) is known. The electric motor is provided on a shaft of a turbine and a compressor and has the following characteristics. The electric motor rotates in the case where a desired supercharging pressure is not obtained because of the shortage of an exhaust gas when supercharging is required or in the case where the supercharger rotates at a low speed. In the case where the turbine is rotated by the exhaust gas to successfully obtain the desired supercharging pressure, the electric motor is rotated by the exhaust gas.

On the other hand, when the supercharging is required, a mechanism including a turbine on an exhaust passage converts an exhaust gas energy into a rotational energy by the turbine to drive a compressor coupled to the turbine through an intermediation of a rotary shaft, thereby performing supercharging work. However, when the supercharging is not required or high load is applied, the turbine acts as an exhaust resistance. As a result, fuel-economy performance is degraded.

Moreover, a turbocharger generally includes a valve called a west gate valve for causing the exhaust gas to bypass the turbine to prevent the load from being too high due to the exhaust gas when the engine is operated with high load. Therefore, the turbocharger has a flow path for causing the exhaust gas to bypass the turbine when the load is high. In this manner, the exhaust gas is caused to bypass a turbine wheel to prevent the exhaust resistance from increasing until the supercharging pressure rises (for example, see JP 2005-171896 A).

In this case, there is no exhaust resistance because the exhaust bypass path is opened to cause the exhaust flow to bypass the turbine wheel until the supercharging pressure rises. However, it is necessary to increase the supercharging pressure by the rotation of the electric motor in the meantime, resulting in consumption of a significant amount of power. Therefore, there is a problem that the fuel-economy performance is likely to be consequently degraded.

SUMMARY OF THE INVENTION

The present invention is devised to solve the problem described above, and has an object of providing an internal combustion engine for improving fuel-economy performance in any of the case where supercharging performed by an electric supercharger is required and the case where the supercharging is not required.

The internal combustion engine according to the present invention includes: an electric supercharger including: an exhaust turbine provided on an exhaust passage; a supercharger connected to the exhaust turbine through an intermediation of a rotary shaft; an electric motor connected to the rotary shaft; and a controller for controlling the electric motor, the electric supercharger being for compressing an intake air by rotation of the supercharger caused with rotation of the exhaust turbine by an exhaust gas energy to perform supercharging and for rotationally driving the supercharger with electric-motor assistance by the electric motor; an exhaust bypass passage provided to bypass the exhaust turbine; and means for opening and closing the exhaust bypass passage, and in the internal combustion engine, the means for opening and closing the exhaust bypass passage opens the exhaust bypass passage until the supercharging is started by the electric supercharger.

The internal combustion engine according to the present invention provides the following effects. When the supercharging performed by the electric supercharger is not required, the exhaust flow is caused to bypass the exhaust turbine to lower an exhaust resistance, thereby improving fuel-economy performance. On the other hand, when the supercharging performed by the electric supercharger is required, the exhaust bypass passage is quickly closed to allow the exhaust turbine to be rotated by the exhaust gas. Then, the supercharger is rotated with a combination of an exhaust gas energy and an energy of the electric motor to control a supercharging pressure to a target supercharging pressure, thereby improving the fuel-economy performance.

DETAILED DESCRIPTION OF THE PREFERRED EMBODIMENT

Hereinafter, a preferred embodiment of a controller for an internal combustion engine according to the present invention is described with reference to the drawings.

First Embodiment

Figure 1:
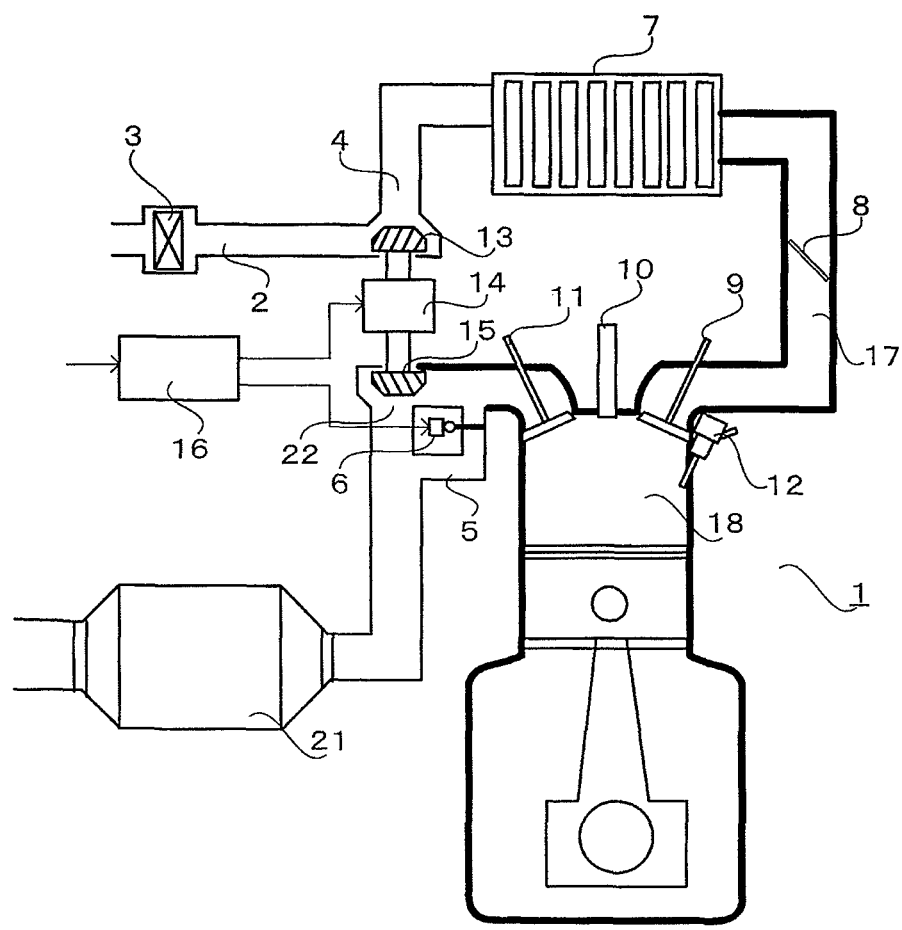
FIG. 1 is a diagram illustrating an overall configuration of an internal combustion engine according to a first embodiment of the present invention.

FIG. 1 is a schematic configuration diagram of an internal combustion engine including an electric supercharger according to a first embodiment of the present invention.

The internal combustion engine, that is, an engine 1 of the present invention is a multi-cylinder engine. However, FIG. 1 illustrates a cross section of only one of the multiple cylinders.

The engine 1 is of a type that injects a fuel into a cylinder 18 by an injector 12. A larger amount of intake air is supercharged by a supercharger (compressor impeller) 13 with electric-motor assistance of an electric motor 14 described below. In this manner, not only an increase in output but also an increase in fuel economy can be realized.

The engine 1, to which the present invention is applied, is not only a direct injection engine for injecting the fuel into the cylinder 18. The present invention is also applicable to a port injection engine for injecting the fuel into an intake passage 17 at downstream of a throttle valve 8.

The electric motor 14 is located on a shaft of an exhaust turbine (turbine wheel) 15 driven by an exhaust gas and a supercharger 13. The supercharger 13, the electric motor 14, and the exhaust turbine 15 constitute an electric supercharger (electric-motor-assisted turbocharger).

In the engine 1, after a waste, a dust, and the like are first removed from an intake air by an air cleaner 3, the intake air flows into a downstream passage 2 in which the supercharger 13 is provided. The air supercharged by the supercharger 13 then flows from an upstream passage 4 into an intercooler 7.

The intercooler 7 lowers a temperature of the intake air, which is increased with an increase in pressure caused by the supercharging, thereby improving filling efficiency. Then, the air supercharged through the throttle valve 8 is sucked into the cylinder 18.

An intake valve 9 is opened to fill the cylinder 18 with the supercharged air. Then, the fuel is ignited by an ignition plug 10 to be combusted. An exhaust gas generated when the fuel combusts is exhausted from an exhaust valve 11. Here, an exhaust passage branches into two passages, that is, an exhaust passage 22 leading to the exhaust turbine 15 and an exhaust bypass passage 5. Exhaust gas flow rate adjusting means 6 which can adjust a flow rate of the exhaust gas in the exhaust bypass passage 5 is provided on the exhaust bypass passage 5. The exhaust gas flow rate adjusting means 6 receives a signal from a controller 16 for the electric supercharger to adjust the flow rate of the exhaust gas. A feature of the present invention resides in the exhaust gas flow rate adjusting means 6, and hence the details thereof are described below. An exhaust gas purification catalyst 21 for purifying the exhaust gas is connected to the exhaust bypass passage 5.

Next, the exhaust gas flow rate adjusting means 6 which receives the signal from the controller 16 for the electric supercharger to adjust the flow rate of the exhaust gas and the electric motor 14 are described in detail.

The controller 16 for the electric supercharger receives command values of the number of engine revolutions, a degree of opening of an accelerator, power supplied to the electric supercharger, an intake pressure, the amount of intake air, and the like to drive the electric motor 14. More specifically, if a current to be supplied can be detected, the power to be supplied to the electric supercharger can be calculated by a multiplication of the supplied current by a voltage value.

The intake pressure can be obtained, for example, by providing a pressure sensor in the intake passage 17 at the downstream of the throttle valve 8.

The amount of intake air can be obtained, for example, by providing an air flow sensor on the downstream side of the air cleaner 3.

Next, an operation of the electric motor 14 is described.

The controller 16 for the electric supercharger receives a supercharge command value from, for example, an engine computer. At this time, in the case where a supercharging pressure has not reached a necessary supercharging pressure, the electric motor 14 is operated to assist in increasing the supercharging pressure. On the other hand, in the case where a sufficiently large number of revolutions of the exhaust turbine 15 is obtained by the engine exhaust gas, the electric motor 14 may function as a power generator.

Next, a specific operation is described with reference to a flowchart of FIG. 2.

Figure 2:
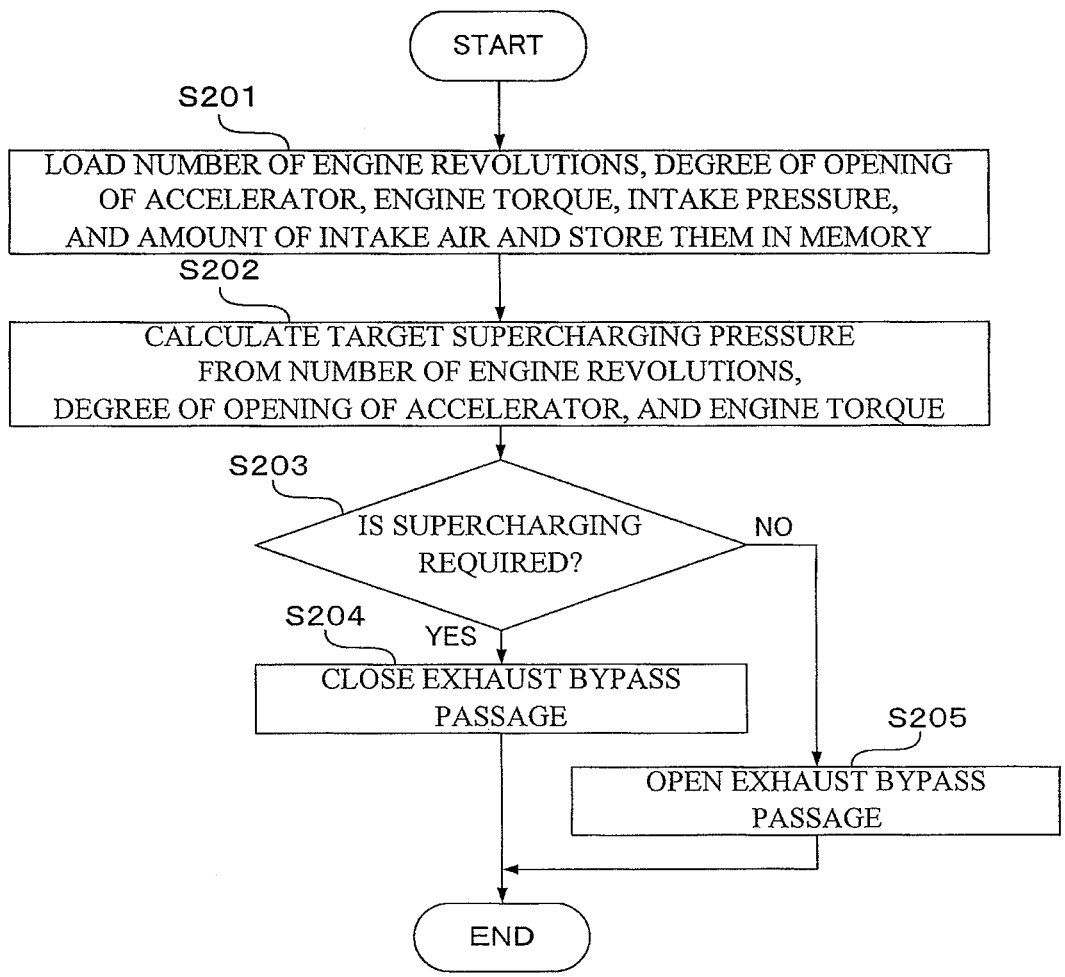
FIG. 2 is a flowchart illustrating an operation of a controller for an electric supercharger according to the first embodiment of the present invention.

FIG. 2 illustrates five steps, that is, Steps S201 to S205 between START and END.

First, in Step S201, the controller 16 for the electric supercharger loads the number of engine revolutions, the degree of opening of the accelerator, an engine torque, the intake pressure, and the amount of intake air to store them in a memory (not shown) of a microcomputer.

Next, in Step S202, a target supercharging pressure of the electric supercharger is calculated from the number of engine revolutions, the degree of opening of the accelerator, and the engine torque. In this operation, for example, it is sufficient that a necessary supercharge-assist amount obtained from the number of revolutions of the engine, the degree of opening of the accelerator, and the engine torque is prestored in a map or the like to calculate the target supercharging pressure. A more specific operation is described with reference to FIG. 3.

Figure 3:
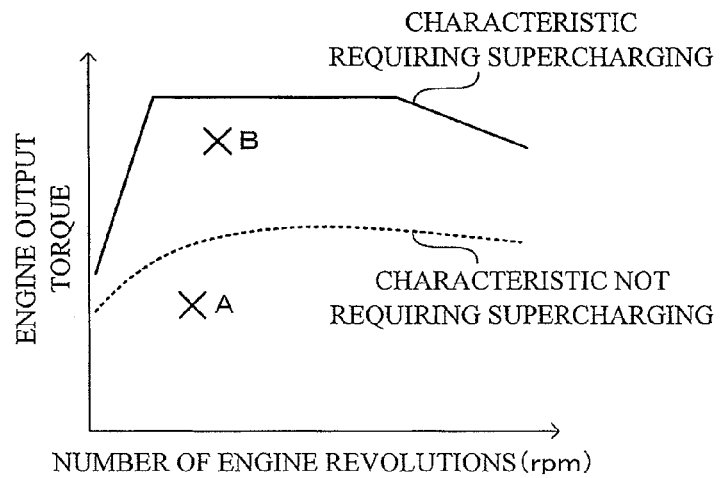
FIG. 3 is a graph illustrating operating points of the internal combustion engine according to the first embodiment of the present invention.

FIG. 3 is a graph illustrating an output characteristic of the internal combustion engine, which illustrates the relation between the number of revolutions of the internal combustion engine, an output torque, and the supercharging pressure. For example, while the internal combustion engine is operated at a point A in FIG. 3, the supercharging is not required. Therefore, the target supercharging pressure in Step S202 is 1 when an atmospheric pressure is 1. The supercharging is not required when the internal combustion engine is operated at the point A as illustrated in FIG. 3. Therefore, by using the exhaust bypass passage 5 as the exhaust passage to cause the exhaust gas to bypass the exhaust turbine 15, the effect that an exhaust resistance is lowered to improve fuel-economy performance is provided.

On the other hand, when an operating state of the internal combustion engine is changed from the point A to a point B illustrated in FIG. 3, the point B is contained in an area where the supercharging is required. Therefore, it is necessary to quickly close the exhaust bypass passage 5 by the exhaust gas flow rate adjusting means 6 to rotate the exhaust turbine 15 with the exhaust gas energy.

Figure 4:
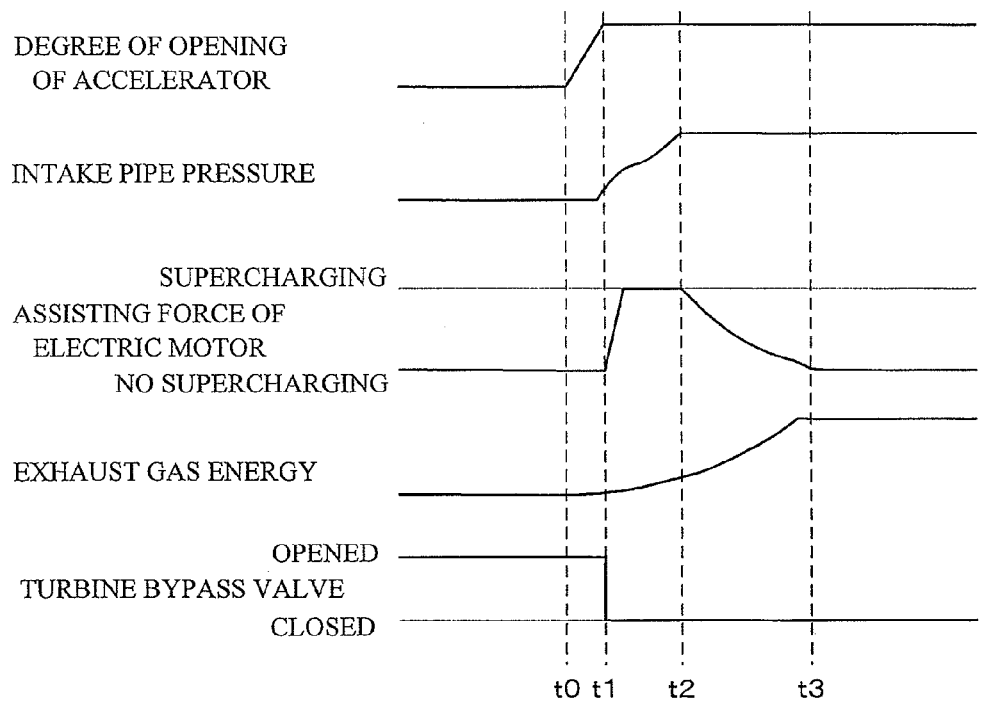
FIG. 4 is a time chart for describing a specific operation according to the first embodiment of the present invention.

A specific operation at this time is described with reference to FIG. 4. FIG. 4 is a time chart when the operating state of the internal combustion engine transits from the point A to the point B illustrated in FIG. 3.

At a time t0, acceleration is started by an operation of the accelerator, which is performed by a driver. At a time t1, with an increase in degree of opening of the accelerator, a pressure of an intake pipe starts increasing. At this time, in the case where it is judged that the supercharging is required, the exhaust bypass passage 5 is closed as illustrated in FIG. 4. Moreover, at this time, whether or not to perform electric-motor assistance is judged according to the degree of acceleration. When the electric-motor assistance is required, the electric-motor assistance is performed with an electric energy.

At a time t2, when the pressure of the intake pipe reaches the target supercharging pressure and a sufficient amount of the exhaust gas energy is obtained, an assisting force of the electric motor 14 is reduced without lowering the pressure of the intake pipe.

At a time t3, when it is judged that the target pressure of the exhaust pipe can be maintained only with the exhaust gas energy, energization of the electric motor 14 is stopped to perform the supercharging only with the exhaust gas energy.

Returning to the flowchart of FIG. 2, the operation is further described.

In Step S203, it is judged from the operating state of the engine 1 whether or not the supercharging is required. The operation in this step is as described above. When the supercharging is not required, the operation proceeds to Step S205. On the other hand, when the supercharging is required, the operation proceeds to Step S204.

In Step S204, the exhaust bypass passage 5 is quickly closed to cause the exhaust gas to flow toward the exhaust turbine 15. In this manner, the electric supercharger operates to perform the supercharging by using the exhaust gas energy.

In Step S205, the exhaust bypass passage 5 is opened. In this manner, the electric supercharger is operated to prevent the exhaust turbine 15 from acting as the exhaust resistance.

Besides, for example, the engine 1 may include throttle position detecting means for detecting a throttle position of a driver. The amount of assistance by the electric motor 14 may be determined and the exhaust bypass passage 5 may be closed according to an output of the throttle position detecting means.

Besides, for example, the engine 1 may include atmospheric pressure detecting means for detecting an atmospheric pressure and intake pipe pressure detecting means for detecting a pressure of an intake pipe. The exhaust bypass passage 5 may be closed according to an output of the atmospheric pressure detecting means and an output of the intake pipe pressure detecting means.

Besides, for example, the engine 1 may include internal combustion engine high-load state detecting means for detecting a high-load state of the internal combustion engine. When the engine 1 is operated in the high-load state, the exhaust bypass passage 5 may be opened to reduce a back pressure if the back pressure becomes excessively high with the exhaust bypass passage 5 being closed, and a temperature of the internal combustion engine is required to be lowered.

Besides, for example, the engine 1 may include internal combustion engine warm-up state detecting means for detecting a warm-up state of the internal combustion engine. When warm-up is required because the engine 1 is just started, the exhaust bypass passage 5 is closed to consciously increase the exhaust resistance. In this manner, the warm-up of the internal combustion engine can be completed earlier. Therefore, in some cases, the fuel-economy performance can be improved by increasing the exhaust resistance when the warm-up is required. As described above, when the internal combustion engine is required to be warmed up or the like, the exhaust bypass passage 5 may be closed even when the supercharging is not required.

As described above, the exhaust gas flow rate adjusting means 6 is controlled according to various conditions. As a result, an optimal supercharging pressure can be obtained. In addition, when the supercharging is not required, the exhaust gas is caused to pass through the exhaust bypass passage 5 to reduce the exhaust resistance by the exhaust turbine 15. In this manner, the fuel-economy performance can be improved.

The exhaust gas flow rate adjusting means 6 can be realized by an electrically driven electromagnetic valve, a check valve, or the like.

As described above, according to this embodiment, when the supercharging performed by the motor supercharger is not required, the exhaust flow is caused to bypass the exhaust turbine 15. In this manner, the exhaust resistance is reduced to improve the fuel-economy performance. On the other hand, when the supercharging performed by the motor supercharger is required, the exhaust bypass passage 5 is quickly closed to rotate the exhaust turbine 15 with the exhaust gas. In this manner, the supercharger 13 is rotated with the combination of two energies, that is, the exhaust gas energy and the energy of the electric motor 14 to control the supercharging pressure to the target supercharging pressure. As a result, the fuel-economy performance can be improved.

Although the operation of the controller 16 for the electric supercharger has been described in this embodiment, the same effects can be obtained even if the controller for the electric supercharger functions as a simple driver for driving the electric motor 14 in the case where the function of the controller for the electric supercharger described above can be provided to, for example, an engine computer or the like.

Further, in this embodiment, the exhaust bypass passage 5 is quickly closed when the supercharging is required. However, the engine may include exhaust turbine revolution number detecting means for detecting the number of revolutions of the exhaust turbine to adjust the flow rate of the exhaust gas flowing through the exhaust bypass passage 5 according to the number of revolutions of the exhaust turbine. By adjusting the flow rate of the exhaust gas in the exhaust bypass passage 5 according to the number of revolutions of the exhaust turbine as described above, the exhaust turbine 15 is kept rotating (for example, at a constant revolution rate of 20,000 rpm) without acting as the exhaust resistance. In this manner, the supercharging pressure can quickly rise. As a result, the effects of improving driving comfort for the driver are also obtained.

Further, after passing through the catalyst, the exhaust gas in the exhaust bypass passage 5 is directly released to the atmosphere in this embodiment. However, the present invention can also be carried out by using an EGR passage and an EGR valve. Besides, the present invention can also be carried out by using a conventionally existing west gate valve. Therefore, the present invention can be realized in a known structure which can construct the exhaust bypass passage for causing the exhaust gas to bypass the exhaust turbine 15.

Besides, for example, even with a structure including a mechanical turbocharger after the electric supercharger, specifically, a so-called twin-turbo structure, the same effects can be obtained.

Although this embodiment of the present invention has been described above, the present invention is not limited to the exemplary embodiment described above. It is apparent to those skilled in the art that various embodiments are possible within the scope of the present invention.

What is claimed is:

1. An internal combustion engine system, comprising:
   an internal combustion engine;
   an electric supercharger including: an exhaust turbine provided on an exhaust passage; a supercharger connected to the exhaust turbine through a rotary shaft; an electric motor connected to the rotary shaft; and a controller for controlling the electric motor, the electric supercharger being for compressing an intake air by rotation of the supercharger caused with rotation of the exhaust turbine by an exhaust gas energy to perform supercharging and for rotationally driving the supercharger with electric motor assistance by the electric motor;
   an exhaust bypass passage provided to bypass the exhaust turbine;
   an exhaust bypass valve being in the exhaust bypass passage; and
   a controller configured:
     to control the exhaust bypass passage valve to open when an operating state of the internal combustion engine is at a point where supercharging pressure is not required by the electric supercharger,
     to control the exhaust bypass valve to close when an operating state of the internal combustion engine is at a point where supercharging pressure is required by the electric supercharger, and
     to determine an amount of assistance by the electric motor and close the exhaust bypass passage in response to a throttle position of the engine.

2. The internal combustion engine according to claim 1, wherein the controller is further configured to close the exhaust bypass passage according to an atmospheric pressure value and an intake pipe pressure value.

3. The internal combustion engine according to claim 1, wherein the controller is further configured to close the exhaust bypass passage according to a number of revolutions of the exhaust turbine.

4. The internal combustion engine according to claim 1, wherein the controller is further configured to close the exhaust bypass passage when it is judged that warm-up of the internal combustion engine is not completed.

5. The internal combustion engine according to claim 1, wherein the controller is further configured to open the exhaust bypass passage when the internal combustion engine is in a high load state in which a temperature of the internal combustion engine is required to be lowered.

* * * * *